HIGH FREQUENCY ELECTRON DISCHARGE DEVICES OF THE KLYSTRON TYPE

Filed Sept. 28, 1962

INVENTORS
CURTIS E. WARD
RICHARD K. MACDONALD
LISTER E. CARROLL

BY Wm. J. Nolan
ATTORNEY 3,268,762

IMPROVED HIGH FREQUENCY ELECTRON DISCHARGE DEVICES OF THE KLYSTRON TYPE

Curtis E. Ward, Los Altos, Richard K. MacDonald, San Jose, and Lister E. Carroll, Belmont, Calif., assignors to Varian Associates, Palo Alto, Calif., a corporation of California Filed Sept. 28, 1962, Ser. No. 226,970
13 Claims. (Cl. 315—5.53)

This invention relates in general to high frequency electron discharge devices and more particularly to novel tunable cavity type velocity modulation devices having novel frequency modulation (FM) linearity and mode suppression means such as, for example, klystron tubes of the internal-external cavity type.

High frequency klystrons utilized in modern communication networks such as in microwave relay applications have to meet stringent standards with respect to frequency stability, operating lifetime and distortion. Additionally it is highly desirable to provide variable tuning means in klystrons of the internal-external cavity resonator type. Furthermore, it is desirable to provide the user with means to adjust the output coupling of a given tube, for example, a reflux klystron of the internal-external cavity resonator type functioning as an oscillator. The FM linearity of a klystron oscillator is a function of the degree of loading of the oscillator and therefore is greatly affected by the output coupling regardless of tube type or beam impedance.

The terminology FM linearity as used herein refers to the tube characteristic curve of frequency vs. reflector voltage. Perfect linearity would result in a perfectly straight line for the slope of the above characteristic over the electronic tuning bandwidth of the tube. Any deviation of this slope from a straight line would result in nonlinearity. Since, as mentioned above, FM linearity is a function of the degree of loading of the oscillator at the operating or main mode of oscillation it is necessary to provide a klystron oscillator with output coupling adjustment means so as to present an optimum load to the tube at the frequency of operation.

Formerly, the user would insert a linearizing means in the output waveguide leading to his transmitter, for purposes of illustration, and would attempt to obtain perfect FM linearity by adjusting the above mentioned linearizing means. However, the user would be attempting to simultaneously adjust both the resistive and reactive load components presented to the tube to obtain FM linearity. This adjustment was extremely critical and difficult to make and the user would frequently overload the tube at the main mode of oscillation to the extent that the main mode oscillations would be overcoupled and cease to exist.

The present invention presents an optimum resistive load to the tube at the output of the external cavity leading to the output waveguide which is capable of only vernier adjustments. Thus, the user cannot overload at the main or operating mode of oscillation and stop main mode oscillation. The user can, however, provide an optimum resistive load to the tube within the frequency range of operation of the tube by simply retracting or advancing the FM linearity screw of the instant invention. Thus where formerly the user was attempting to adjust both reactive and resistive load components presented to the tube to obtain optimum FM linearity, with the present invention he has only to adjust the reactive load component after adjusting the resistive component. This greatly simplifies FM linearity adjustments since the resistive component presented to the tube by the user's linearizing means will be negligible in comparison to the resistive component presented to the tube by the FM linearity adjustment device of the instant invention.

The present invention provides a novel solution for the above mentioned FM linearity problem and additionally serves to suppress the undesired low mode of oscillation occuring in a klystron oscillator of the internal-external cavity resonator type. In addition to the main or operating mode of oscillation which can be designated as λ, other modes of higher and lower frequencies are capable of being supported in the conventional klystron oscillator of the internal-external cavity type. Of these other modes the 1/2λ and 3/2λ, low mode and high mode respectively, are of primary interest since they are of a magnitude comparable to that of the main mode of oscillation. In order to achieve main mode oscillator operation only it is quite evident that these undesired modes must be eliminated. Prior art techniques utilized lossy screws extending into the external cavity in the vicinity of maximum field strength of the low and high modes of oscillation as shown and described for example, in U.S. Patent No. 2,880,357, issued to D. L. Snow et al. and assigned to the assignee of the present application. Other techniques for eliminating these undesirable modes involve the use of wave traps for the elimination of high modes of oscillation as taught for example, by U.S. Patent No. 2,955,228, issued to Curtis E. Ward, one of the joint inventors herein, and assigned to the assignee of the present application.

The mode suppression techniques in the aforementioned U.S. patents are adequate, but have certain drawbacks which the instant invention obviates. For example, it may be necessary for complete suppression of the above mentioned low mode and high mode oscillations to utilize as many as four or more lossy screws in the external cavity. The present invention eliminates this necessity. Furthermore, present day klystron oscillator requirements are such that families of klystrons are manufactured to meet customer requirements over a wide range of frequencies. For example, in modern communication relay systems a band of frequencies ranging from 3 to 10 kmc. may require as many as seven or more different klystrons to cover the entire band. Each klystron of the series is functionally identical to the others but requires separate castings since the high mode suppression waveguide requires different dimensions for each klystron of the above mentioned series or family. This of course, adds considerably to the expense of construction of the klystrons in a given series. The present invention by employing a novel tuning mechanism in the waveguide channel leading to the wavetrap high mode suppressor enables the manufacturer to produce an entire family of tubes using identical castings for the external cavity resonator and accompanying waveguide channel and wavetrap.

The aforementioned novel FM linearity adjustment device, besides performing the function of allowing the user to optimise the output coupling at any desired frequency within the tube range for the particular load conditions existing in the user's equipment and for the particular tube being used and at its particular point in its operating life, performs the additional function of acting as a low mode suppressor.

Furthermore, the FM linearity adjustment device of the instant invention has the additional attribute in that it is so arranged that the user of the tube can only perform a vernier adjustment with the main adjustment being set at the factory. This allows the customer or user sufficient leeway to optimize the output coupling over the entire frequency range of the tube while simultaneously insuring that the user cannot change the output coupling to such a degree that low mode suppression would be deleteriously affected or that the main mode would be overloaded to the extent of the stopping oscillation.

Accordingly, it is a principle object of the present invention to provide novel improved stable output coupling adjustment means and mode suppresion means for a klystron device.

A feature of the present invention resides in providing novel output coupling adjustment means in an output waveguide of an internal-external cavity resonator klystron.

Another feature of the present invention resides in providing an internal-external cavity resonator klystron oscillator with novel low mode and high mode suppression means.

An additional feature of the present inventon resides in providing an internal-external cavity resonator klystron oscillator with novel FM linearity adjustment means whereby the user can make only vernier adjustments while the main adjustment is factory set.

Another feature of the present invention resides in providing tuning means in a waveguide channel leading device with combined novel FM linearity adjustment means and novel low mode and high mode suppression means.

Another feature of the present invention resides in providing tuning means in a waveguide channel leading from the external cavity of a klystron device of the internal-external cavity resonator type to an adjoining high mode suppression wave trap means whereby the cut-off frequency of said waveguide channel can be adjustably controlled.

Another feature of the present invention resides in providing a klystron device with unitary output coupling control means and low mode suppression means.

Other features and advantages of the present invention will become apparent upon a perusal of the specification taken in conjunction with the accompanying drawings, wherein, FIG. 1 shows a longitudinal cutaway view of a reflex klystron device of the internal-external cavity resonator type incorporating the novel FM linearity adjustment means and the novel waveguide tuning means for high mode suppression of the present invention.

Figures 1, 2, 3:
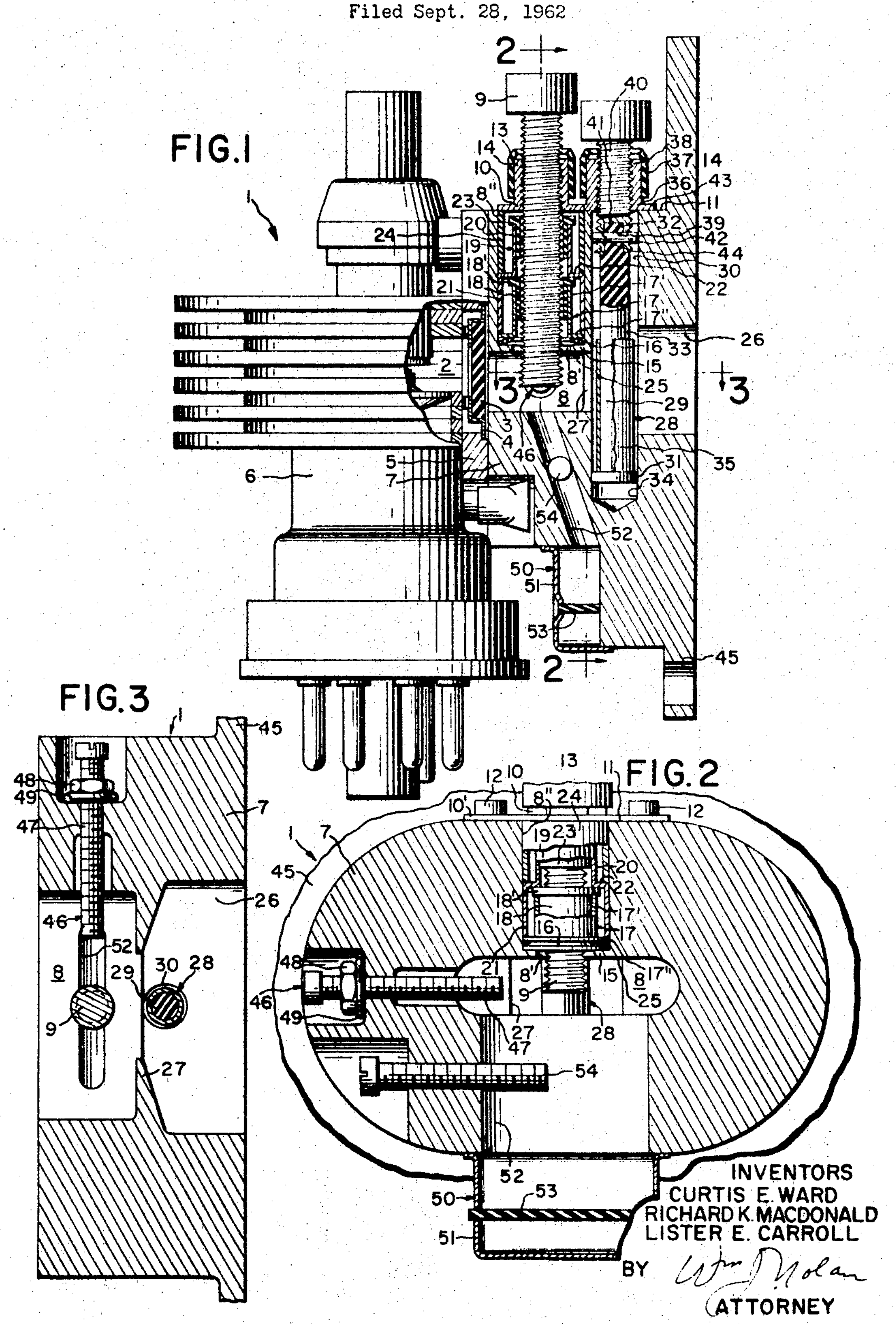
FIG. 2 is a cross-sectional view of the klystron of FIG. 1 taken along section lines 2—2.
FIG. 3 is a cross-sectional view of the klystron device of FIG. 1 taken along section lines 3—3.

Referring now in more detail to the structure depicted in FIGS. 1, 2, and 3 there is shown by way of illustration a typical reflex klystron 1 of the internal-external cavity resonator type having an evacuated internal cavity 2 with the usual electron gun, interaction means and reflector electrode. The particular details of the reflex klystron will not be described herein since the operation and construction of this general type of reflex klystron is covered extensively in the prior art.

A wave energy permeable vacuum sealed window 3 of ceramic or the like is affixed to a flexible window frame member 4 of Kovar or the like. The window frame 4 is brazed to a window plate member 5 of steel or the like which in turn is brazed to the main body member 6 of the reflex klystron on one face thereof and brazed to the main body member 7 of the external cavity 8 on the other face thereof. The above mentioned joints and members form a vacuum tight seal between the evacuated internal and unevacuated external cavities.

Tuning screw 9 extends into external cavity 8 through central aperture 8′ and enlarged counterbore 8″ and provides variable tuning means for the reflex klystron whereby the operating frequency of the klystron can be varied over the frequency range of the tube. Tuning screw 9 is supported in movable relation with respect to external cavity 8 by means of an ordinary commercial nut 10 having flange portion 10′ which is secured to upper surface 11 of body 7 by a pair of head cap screws 12, as shown in FIG. 2. A plastic hooded sleeve 13 is slipped over the upwardly directed body portion 14 of commercial nut 10 as shown and serves as protective means to keep dirt, dust, etc. out of the meshed threads of screw 9 and nut 10.

An inwardly directed flange portion 15 serves to define the central aperture 8′. Positioned on the upper surface of flange 15 is annular spring member 16. Located in counterbore portion 8″ and engaging the upwardly directed surface of spring member 16 is a radio frequency choke 17 of a suitable low loss conductive material having an upper cylindrical portion 17′ and a flanged bottom portion 17″ nesting in counterbore portion 8″ and positioned upon spring member 16. Dielectric sleeve 18 made of, for example, Teflon, is closely fitted between choke 17 and screw member 9 and functions as a bearing in which tuning rod 9 moves. Outwardly directed flange portion 18′ of sleeve 18 bears on the upper edge of choke 17 and prevents any contact between screw 9 and choke 17 as well as maintaining sleeve 18 in a fixed position. Upper choke 19 of a low loss conductive material, having upper cylindrical portion 20, lower off-set cylindrical portion 21 and a ring like intermediate portion 22 is positioned upon flange portion 18′ of sleeve 18 and bears thereon. Upper cylindrical portion 20 is displaced from screw 9 by dielectric sleeve 23, similar in construction and function to sleeve 18. Lower off-set portion 21 is nested in counterbore 18″ and the lower edge of off-set portion 21 rests upon lower flange 17″ and is conductively connected thereto. Dielectric retaining sleeve 24 of cylindrical configuration is nested in counterbore 8″ and the lower edge of sleeve 24 bears on the upper surface of the ring like portion 22 of upper choke 19. The upper edge of sleeve 24 bears against flange portion 10′ of nut 10 and thus serves to maintain the entire choke assembly in a fixed position.

The above construction of the tuner assembly provides two long-wearing bearing supports for the capacitive tuning screw and eliminates metal-to-metal contact at any portion of the assembly which carries RF current and which could therefore produce RF noise in the cavity 8.

Operation of the non-metal contacting double choke capacitive tuner is as follows. The upper end of lower choke 17 extends ¼ wavelength at the operating frequency of the device from the upper wall 25 of cavity 8. Lower end 17″ is electrically shorted to the end of lower off-set portion 21 of upper choke 19. Therefore an electrical short circuit at the operating frequency of the device is provided at the junction of tuner screw 9 and cavity wall 25. The upper choke 19 functions similarly to choke 17 and provides added protection against RF leakage. The operation of the above mentioned tuner is described in U.S. Patent No. 3,125,734, issued March 17, 1964, by Curtis E. Ward.

External cavity 8 is coupled to output waveguide 26 by a conventional inductive iris 27, as best seen in FIG. 3. Closely adjacent to iris 27 is an FM linearity adjustment assembly 28 having a dielectric rod 29 which is mounted within bore 30 in main body member 7. Dielectric rod 29 has a first enlarged flange portion 31 at one end thereof, a second reduced portion 32 at the other end thereof and an intermediate portion 33 therebetween. The enlarged portion 31 is disposed within a hollowed out cylindrical bore 34 in the bottom well of output waveguide 26 and slidingly engages the walls thereof. A low loss conductive sleeve 35 surrounds the intermediate portion of said dielectric rod over a substantial portion of the length thereof and is securely fitted thereto. One end of conductive sleeve 35 rests on the upwardly directed surface of enlarged flange portion 31. There is no conductive contact between sleeve 35 and any conductive surface within waveguide 26. A commercial nut 36 similar to commercial nut 10 is secured to upper surface 11 of main body member 7. A plastic hooded sleeve 37 similar in construction and function to sleeve 13 surrounds the cylindrical internally threaded upwardly directed portion 38 of nut 36. Reduced end portion 32 of dielectric rod 29 has a transverse aperture 39 extending therethrough. A metal screw 40 having external threads thereon extends through nut 36 in threaded engagement. Screw 40 has an internal bore 41 axially directed and extending inwardly from the tip thereof along a portion of the total screw length. The reduced portion 32 of the dielectric rod 29 is positioned within said internal bore 41 and maintained therein by a transversely directed pin 42 extending through aligned transverse apertures 39, 44 in said reduced portion 32 and the surrounding wall of said internal bore 41, respectively. The ends of pin 42 protrude beyond the threaded portion of screw 40 as shown in FIG. 1. Commercial nut 36 has a flanged portion 43 extending over bore 30 as shown.

Main body member 7 has a mounting flange portion 45 for ease of attachment. Cylindrical bore 34 is of sufficient depth to allow a variation in range of setting of dielectric rod 29. Pin 42 serves as an upper stop beyond which the user cannot further vary the output coupling since pin 42 will bear against flange 43 when screw 40 is retracted a certain specified distance. The amount of clearance between the bottom surface of bore 34 and the opposing surface of enlarged flange portion 31 when screw 40 is fully retracted, serves to define the vernier adjustment limits within which the customer may vary the output coupling and control the FM linearity as previously described.

The main adjustment is factory set and the user is permitted only to make a vernier adjustment. It is desirable to use a dielectric screw for the FM linearity adjustment since this eliminates any problems arising from conductive contacts between the screw and the conductive surfaces in waveguide 26 and bore 34 and 30. It is desirable to have metal sleeve 35 be about ⅜λ long at the frequency of the main mode of operation. Metal sleeve 35 acts as a series resonant circuit shunted across the output waveguide 26 with both variable capacitance and variable inductance. The capacitance occurs between the sleeve ends and the waveguide walls around and including the bores 34 and 30 while the inductance is essentially the sleeve length protruding into waveguide 26. As the screw 40 is turned both the inductance and capacitance will vary as sleeve 35 is advanced and retracted into and from, bore 34. Flange 31 serves as a sliding bearing and will prevent transverse motion of rod 29 due to vibration and additionally serves to prevent sleeve 35 from shorting to the iris 27, bore 34 or waveguide 26 walls. Thus it is readily seen that all metal-to-metal contacts in the RF circuits are eliminated.

For purposes of illustration the range of vernier adjustment permitted the user could vary from 90%, which is the coupling percent set at the factory, to perhaps 110%. The user would not be able to reduce the output coupling below the 90% value set at the factory. Thus the user is limited to a safe range of variation of output coupling and cannot change the coupling to the extent that low mode suppression will be adversely affected or to such a degree that the main mode would be overloaded to the extent of stopping oscillation. By placing the sleeve 35 at a waveguide wall opposite the wall upon which screw 40 is mounted, the output coupling adjustment device has what may be termed right hand sense. Thus, turning the screw clockwise will increase the output coupling and turning the screw counter-clockwise will decrease the output coupling.

The dielectric rod and conductive sleeve modify the impedance characteristics of the iris 27 and are arranged with respect to the iris as to be self resonant below the operating frequency range of the tube. Thus the FM linearity adjustment means 29, 35 serves the additional function of suppressing the low mode of oscillation since this mode is overcoupled to the extent that it will not be able to build up and start oscillation, whereas the main mode of operation is not overcoupled and can oscillate. FM linearity is achieved since the customer can control the output coupling by the vernier adjustment so as to operate at optimum power out for the entire range of frequencies over which the tube is designed to operate, by presenting an optimum resistive load component to the tube at the selected main mode of oscillation.

Extending into external cavity 8, as shown best in FIGS. 2 and 3, is additional low mode suppression means 46 comprising a screw member 47 and lock nut 48 with washer 49. Screw member 47 is made of any suitable lossy material such as iron or the like and is inserted into cavity 8 in the vicinity of maximum field strength of the low mode of oscillation. Low mode suppression screw 47 is made a ¼λ at the low mode frequency, therefore the low mode of oscillation will be strongly coupled to lossy member 47 and dissipated while the main mode of oscillation will be substantially unaffected.

Wave mode trap 50 best shown in FIGS. 1 and 2 includes a wave trap cup 51 coupled to external cavity 8 through waveguide 52. Cup 51 has a lossy resistive card 53 positioned therein as shown, which functions to dissipate any energy coupled into wave cup 51 through waveguide channel 52. Waveguide channel 52 is so dimensioned as to be a cut off for the main mode of oscillation and the low mode of oscillation but will pass the 3⁄2λ or high modes of oscillation which will then be dissipated by resistive card 53. A metallic tuning screw 54 is positioned in an aperture extending through waveguide channel 52 as shown. This screw provides a novel high mode suppressor tuning means which serves to vary the cut-off frequency of waveguide 52 by capacitive tuning. Alternately screw 54 can be made of nylon or some other suitable dielectric material and serve to control the electrical dimensions of waveguide 52 by dielectric loading.

This novel tuning means allows the manufacturer to utilize a single casting for waveguide channel 52 and external cavity 8 for an entire family of tubes as mentioned previously and still obtain high mode suppression for each individual tube of the family over the entire frequency band of the family. Since it is virtually impossible to machine a waveguide channel 52 because of its angular orientation with respect to body member 7, individual castings formerly were required for each member of a family. This expensive process is now obviated because of the novel tuning screw of the instant invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electron discharge device of the internal-external cavity resonator type capable of supporting a plurality of modes of oscillation, including low mode, main mode and high modes comprising, a main body portion having an evacuated internal cavity resonator formed therein adapted and arranged to provide interaction means for an electron beam, another body portion having an unevacuated external cavity resonator formed therein, a wave energy permeable window vacuum sealed between the evacuated and unevacuated cavities whereby coupling between the two cavities is provided, tuning means in said external cavity resonator for tuning said electron discharge device over the operating frequency range of said device, said external cavity having an iris output aperture located in a cavity wall opposite the wall wherein the wave energy permeable window is located to thereby provide output coupling means for the external cavity, output waveguide means disposed adjacent to said iris output aperture and oppositely directed from said external cavity thereby providing output guide means for energy coupled through said output aperture, said output waveguide having a first bore extending through a wall thereof, said first bore being closely adjacent said iris output aperture, said output waveguide having a second bore extending partially through a wall thereof oppositely disposed from said wall through which said first bore extends, output coupling adjustment means mounted on the exterior wall surface of said output waveguide means, said output coupling adjustment means extending through said first bore and across said output waveguide in close proximity to said iris output aperture and terminating in said second bore, said output coupling adjustment means comprising a dielectric rod having a first enlarged flange portion at one end thereof, a second reduced portion at the other end thereof, and an intermediate portion therebetween, said first enlarged flange portion disposed within said second bore and slidingly engaging the walls thereof, a low loss conductive sleeve surrounding the intermediate portion of said dielectric rod over a substantial portion of the length thereof and securely fitted thereto, one end of said conductive sleeve positioned on an adjoining surface of said enlarged portion.

2. In a reflex klystron of the internal-external cavity resonator type including, an evacuated internal cavity resonator adapted and arranged for interaction with an electron beam, an external cavity resonator coupled to said internal cavity resonator, output waveguide means coupled to said external cavity resonator, and an output coupling adjustment device including low mode suppression means, said output coupling adjustment device being positioned in said output waveguide, said output coupling adjustment device and said low mode suppression means comprising, a dielectric member having a conductive sleeve member mounted thereon.

3. A klystron oscillator including cavity resonator means capable of supporting a plurality of modes of oscillation including low, main and high modes of oscillation, said resonator means having output waveguide means coupled thereto, coupling means coupling said resonator means to said output waveguide means, output coupling adjustment means positioned in said output waveguide means, said output coupling adjustment means being adapted and arranged to suppress the low mode of oscillation while presenting an optimum resistive load component to the cavity resonator means at the main mode of oscillation over the operating frequency range of the cavity resonator means, said output coupling adjustment means including a movable dielectric rod and a conductive member attached thereto.

4. The klystron oscillator defined in claim 3 wherein the conductive member is $\frac{3}{8}\lambda$ long at the frequency of the main mode of oscillations.

5. An electron discharge device of the internal-external cavity resonator type, comprising coupled internal and external cavity resonators capable of supporting a plurality of modes of oscillation, including low mode, main mode and high modes of oscillation, said internal cavity resonator having electron beam producing means coupled thereto, said external cavity having output waveguide means coupled thereto, output coupling adjustment means positioned in and rotatably supported within said output waveguide means for suppressing low mode oscillations while simultaneously presenting an optimum resistive load component to the device at the frequency of the main mode of oscillation over the operating frequency range of the device and for increasing the coupling at the main mode of oscillation between said device and an external load upon further insertion of said means into said waveguide upon clockwise rotation of said output coupling adjustment means.

6. A klystron oscillator device comprising, an external cavity coupled to said klystron, an output waveguide coupled to said external cavity, output coupling adjustment means positioned in said output waveguide and self-resonant below the operating frequency range of the oscillator, whereby low mode oscillations are overcoupled so as to be suppressed said adjustment means including a conductive member disposed within said output waveguide, said conductive member being in D.C. isolation with respect to the output waveguide.

7. A klystron oscillator of the internal-external cavity resonator type, comprising coupled internal and external cavity resonators capable of supporting a plurality of modes of oscillation, including low mode, main mode and high modes of oscillation, said internal cavity resonator having electron beam producing means coupled thereto, said external cavity resonator having a high mode suppression wave trap coupled thereto through a waveguide coupling section, tuning screw means disposed in said waveguide coupling section for tuning said high mode suppression wave trap.

8. The oscillator of claim 7 wherein the tuning means in said waveguide coupling section is a movable conductive screw member.

9. The oscillator of claim 7 wherein the tuning means in said waveguide coupling section is a movable dielectric screw member.

10. A klystron oscillator of the internal-external cavity resonator type, comprising coupled internal and external cavity resonators capable of supporting a plurality of modes of oscillation, including low mode, main mode and high modes of oscillation, said internal cavity resonator having electron beam producing means coupled thereto, said external cavity resonator having a high mode suppression wave trap coupled thereto through a waveguide coupling section having tuning means therein, said external cavity resonator having output waveguide means coupled thereto through an output iris, said output waveguide means having output coupling adjustment means positioned therein for suppressing low mode oscillations, said output coupling adjustment means including a dielectric member and a conductive member positioned within said output waveguide, said conductive member being in D.C. isolation with respect to said output waveguide.

11. The cavity resonator means of claim 3 wherein the output coupling adjustment means is provided with vernier adjustments only whereby the output coupling adjustment means cannot overcouple to the extent where main mode oscillations will be stopped.

12. The device of claim 5 wherein the output coupling adjustment means is provided with vernier adjustments only whereby the device cannot be overcoupled at the main mode of oscillation to the extent where main mode oscillations are stopped or undercoupled at the low mode of oscillation to the extent where low mode oscillations are not suppressed.

13. The device of claim 6 wherein the output coupling adjustment means is provided with vernier adjustments only whereby the device cannot be overcoupled at the main mode of oscillation to the extent where main mode oscillations are stopped or undercoupled at the low mode of oscillation to the extent where low mode oscillations are not suppressed.

References Cited by the Examiner

UNITED STATES PATENTS

| | | | |
|---|---|---|---|
| 2,880,357 | 3/1959 | Snow et al. | 315—5.23 |
| 2,955,228 | 10/1960 | Ward | 315—5.21 |

DAVID J. GALVIN, *Primary Examiner.*

V. LAFRANCHI, *Assistant Examiner.*